United States Patent
Hatakeyama et al.

(10) Patent No.: US 10,954,022 B2
(45) Date of Patent: Mar. 23, 2021

(54) DOUBLE WALLED CONTAINER

(71) Applicant: Heiwa Kagaku Industry Co., Ltd., Ichikawa (JP)

(72) Inventors: Kazuyuki Hatakeyama, Ichikawa (JP); Harumasa Hatakeyama, Ichikawa (JP)

(73) Assignee: HEIWA KAGAKU INDUSTRY CO., LTD., Ichikawa (JP)

( * ) Notice: Subject to any disclaimer, the term of this patent is extended or adjusted under 35 U.S.C. 154(b) by 6 days.

(21) Appl. No.: 16/060,175

(22) PCT Filed: Nov. 15, 2016

(86) PCT No.: PCT/JP2016/083824
§ 371 (c)(1),
(2) Date: Jun. 7, 2018

(87) PCT Pub. No.: WO2017/098867
PCT Pub. Date: Jun. 15, 2017

(65) Prior Publication Data
US 2018/0354671 A1    Dec. 13, 2018

(30) Foreign Application Priority Data
Dec. 9, 2015    (JP) ............................. JP2015-240348

(51) Int. Cl.
*B65D 1/02* (2006.01)
*B65D 83/00* (2006.01)
(Continued)

(52) U.S. Cl.
CPC ............ *B65D 1/0215* (2013.01); *B29C 49/22* (2013.01); *B29C 49/4802* (2013.01);
(Continued)

(58) Field of Classification Search
CPC ................ B65D 23/00; B65D 23/0857; B65D 23/0885; A47J 41/02
(Continued)

(56) References Cited

U.S. PATENT DOCUMENTS

| 5,799,809 | A | 9/1998 | Sako et al. | |
|---|---|---|---|---|
| 8,757,440 | B2 * | 6/2014 | Ouillette | B65D 77/067 222/105 |

(Continued)

FOREIGN PATENT DOCUMENTS

| JP | 8-216238 A | | 8/1996 |
|---|---|---|---|
| JP | 2003024823 | * | 1/2003 |

(Continued)

OTHER PUBLICATIONS

International Search Report dated Jan. 17, 2017, issued in counterpart International Application No. PCT/JP2016/083824 (2 pages).
(Continued)

*Primary Examiner* — J. Gregory Pickett
*Assistant Examiner* — Tia Cox
(74) *Attorney, Agent, or Firm* — Westerman, Hattori, Daniels & Adrian, LLP

(57) ABSTRACT

A double walled container has a container bottom that is blow molded after an intermediate portion of a parison in the vertical direction is sandwiched by a split mold from the horizontal direction; at least a portion of the container bottom is sandwiched by the split mold; the container bottom has a bottom projection on the underside of the container bottom made of the outer layer of a rigid outer layer container and the outer layer of a flexible inner layer container; in the bottom projection, an extended portion of the rigid outer layer container and an extended portion of the flexible inner layer container have protrusions and recesses of different heights in the horizontal direction; and the
(Continued)

protrusions and recesses are combined so that the extended portions of the rigid outer layer container and the flexible inner layer container do not shift vertically with respect to each other.

3 Claims, 8 Drawing Sheets

(51) Int. Cl.
| | | |
|---|---|---|
| | *B65D 23/00* | (2006.01) |
| | *B29C 49/22* | (2006.01) |
| | *B29C 49/48* | (2006.01) |
| | *B32B 27/08* | (2006.01) |
| | *B32B 27/30* | (2006.01) |
| | *B32B 27/32* | (2006.01) |
| | *B29K 23/00* | (2006.01) |
| | *B29L 31/00* | (2006.01) |

(52) U.S. Cl.
CPC ............ *B32B 27/08* (2013.01); *B32B 27/306* (2013.01); *B32B 27/32* (2013.01); *B65D 1/02* (2013.01); *B65D 1/0276* (2013.01); *B65D 23/001* (2013.01); *B65D 83/0061* (2013.01); *B29C 2049/4805* (2013.01); *B29K 2023/0633* (2013.01); *B29K 2023/086* (2013.01); *B29K 2023/12* (2013.01); *B29L 2031/712* (2013.01); *B32B 2439/00* (2013.01)

(58) Field of Classification Search
USPC ...... 215/12.1, 902; 220/105, 9.4, 9.1, 62.21; 222/105
See application file for complete search history.

(56) References Cited

U.S. PATENT DOCUMENTS

| | | | | |
|---|---|---|---|---|
| 9,067,709 | B2* | 6/2015 | Furusawa | ............... B32B 27/32 |
| 10,308,389 | B2* | 6/2019 | Taruno | ................... B65D 1/023 |
| 2003/0226856 | A1* | 12/2003 | Nakamura | ............. B65D 25/16 |
| | | | | 222/105 |
| 2004/0069735 | A1* | 4/2004 | Yoneyama | ........... B65D 1/0215 |
| | | | | 215/12.1 |
| 2004/0149673 | A1* | 8/2004 | Kuehn | .................... B29C 49/22 |
| | | | | 215/12.1 |
| 2006/0243749 | A1* | 11/2006 | Robertson | ........... B05B 11/0037 |
| | | | | 222/321.5 |
| 2008/0302757 | A1 | 12/2008 | Furusawa et al. | |
| 2017/0036802 | A1 | 2/2017 | Taruno | |

FOREIGN PATENT DOCUMENTS

| | | | |
|---|---|---|---|
| JP | 2004-231273 A | | 8/2004 |
| JP | 2004-231280 A | | 8/2004 |
| JP | 3667826 B2 | | 7/2005 |
| JP | 3710615 B2 | | 10/2005 |
| JP | 2006-103692 A | | 4/2006 |
| JP | 3762105 B2 | | 4/2006 |
| JP | 3874170 B2 | | 1/2007 |
| JP | 4314423 B2 | | 8/2009 |
| JP | 4936249 B2 | | 5/2012 |
| JP | 5295460 B2 | | 9/2013 |
| JP | 2015-101397 A | | 6/2015 |

OTHER PUBLICATIONS

Written Opinion of the International Preliminary Examining Authority dated Nov. 14, 2017, issued in counterpart International Application No. PCT/JP2016/083824 (5 pages).

* cited by examiner

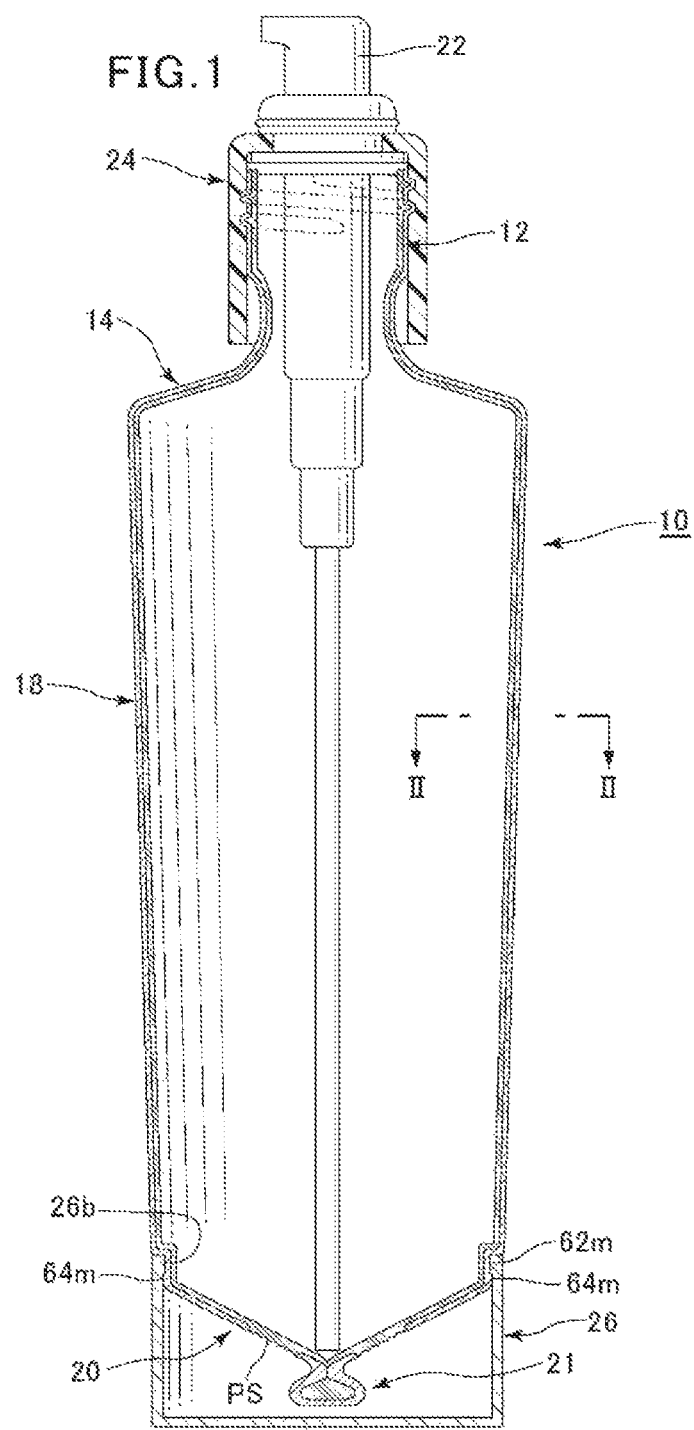

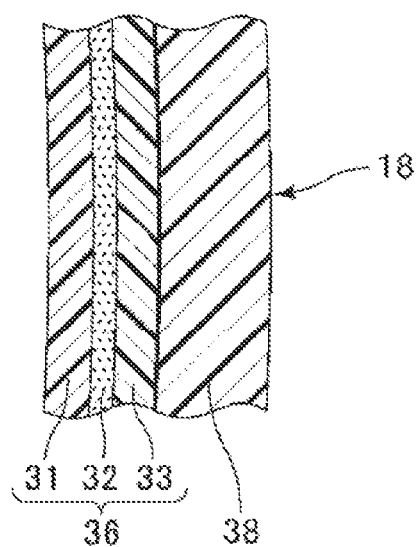

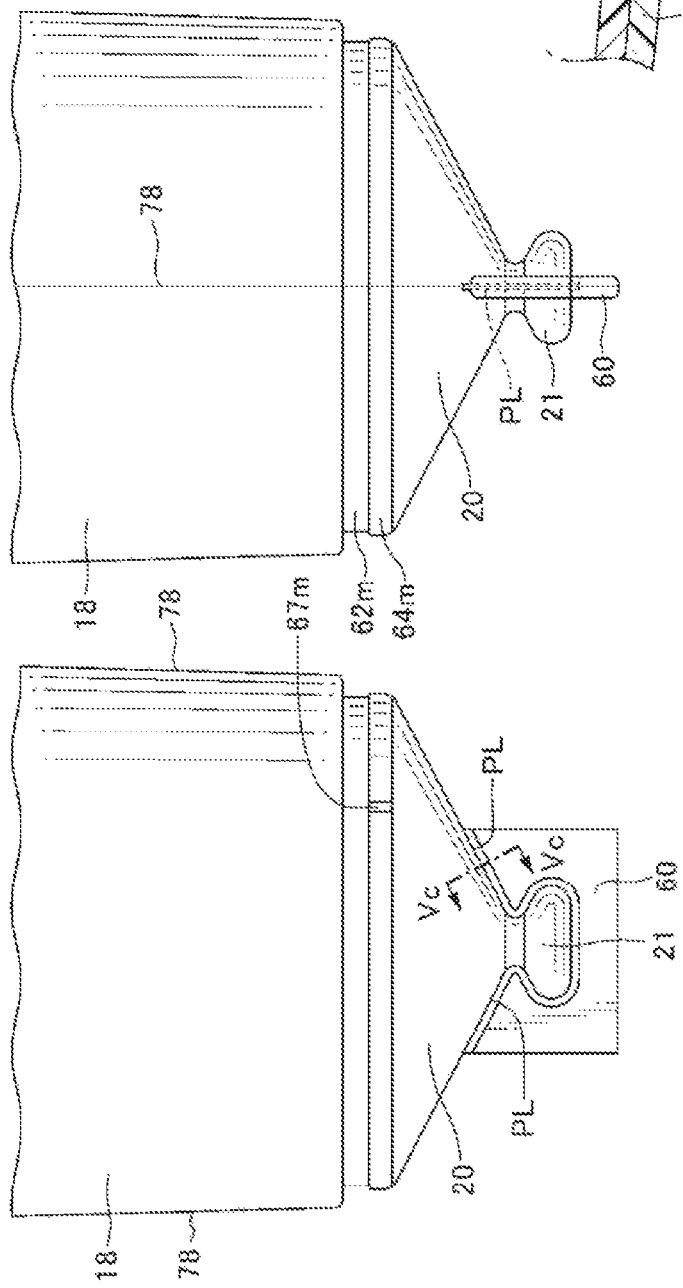
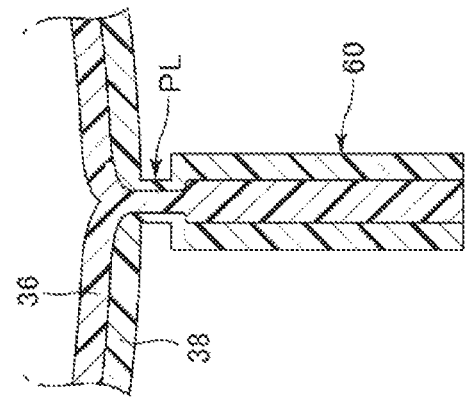

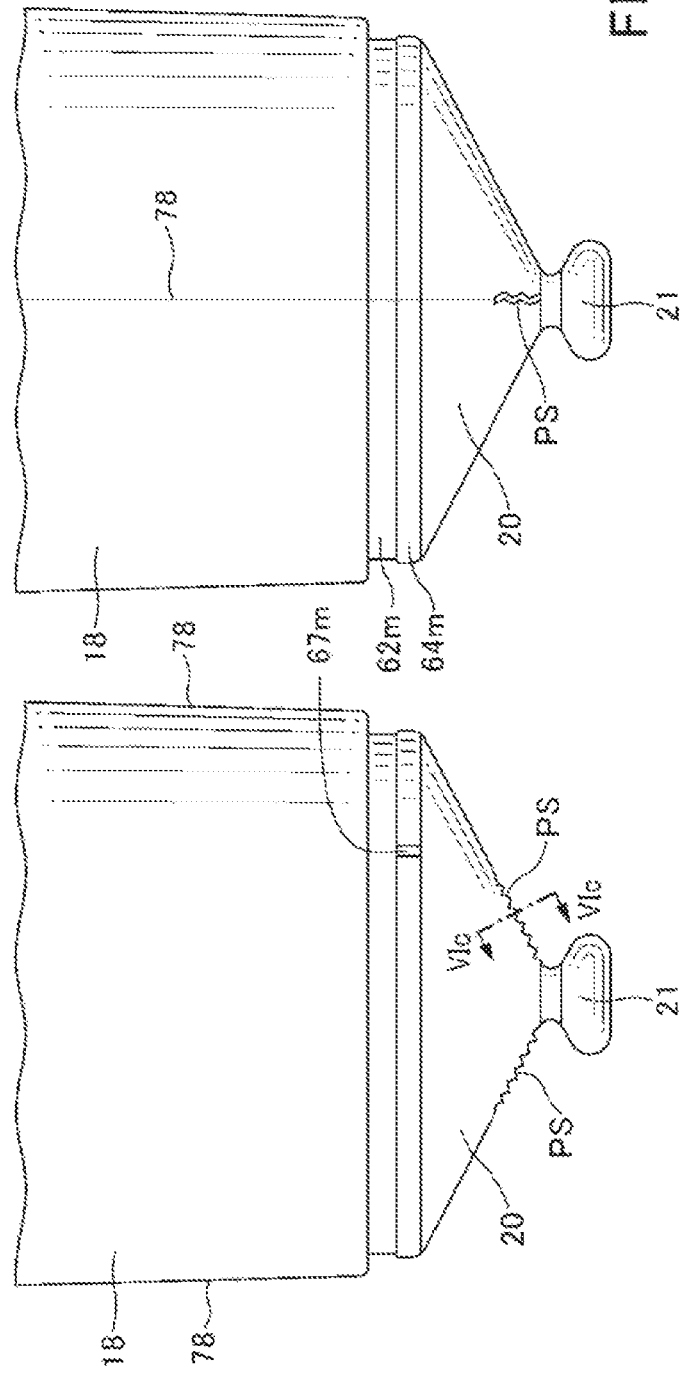
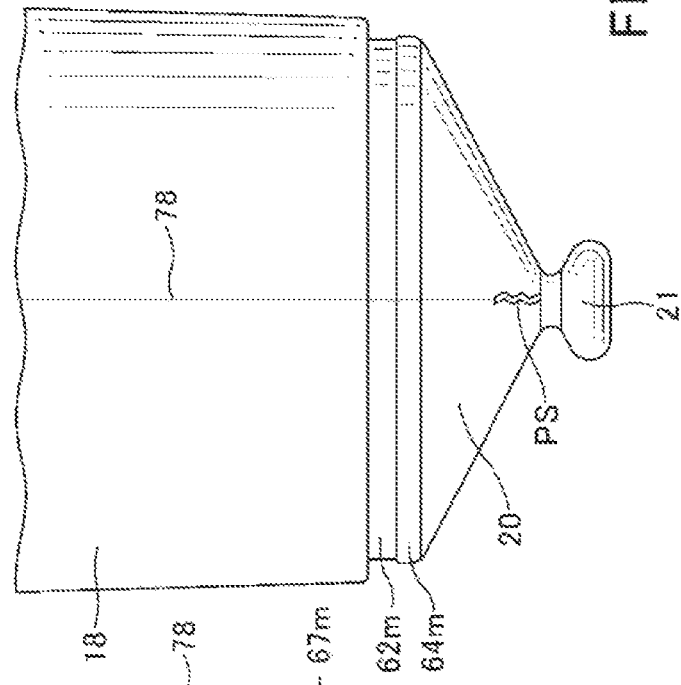
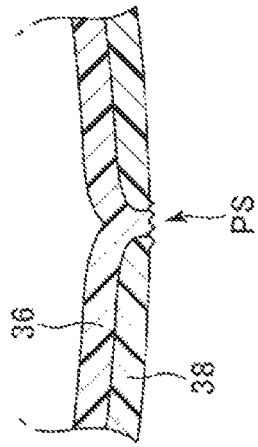

DOUBLE WALLED CONTAINER

TECHNICAL FIELD

This invention relates to a double walled container and a manufacturing method for the same. More specifically, the present invention relates to a double walled container, which is also referred to as delamination bottle or laminated bottle, comprising a relatively rigid outer layer container and a flexible inner layer container that is placed in the outer container and can change its capacity according to the volume of the contents and also to a method of manufacturing the same by which the double walled container can be manufactured easily with molding materials and a molding device that do not differ substantially from conventional ones.

BACKGROUND ART

In this specification, the expression of "direction" is used in terms of the double walled container that is held upright. Thus, if the double walled container is cylindrical, the vertical direction is the direction in which the center axis of the double walled container runs, whereas the horizontal direction is the direction that is orthogonal relative to the center axis of the double walled container. The term of "split mold" typically refers to a metal mold consists of two parts, or two mold halves, although the term does not exclude a split mold that consists of other than two parts.

It is desirable for a container that, if the contents thereof are partly consumed and the volume of the contents are reduced, the contents are not exposed to external air and hence prevented from being oxidized.

More specifically, for ordinary containers, after the container is filled with its contents, it is easy to evacuate the remaining space in the container or fill the remaining space with non-active gas such as nitrogen gas in order to prevent the contents from being oxidized until the container is unsealed. However, for ordinary rigid containers, after the container is unsealed and the contents are partly consumed so that the remaining part of the contents is left in the container, external air gets into the container by the volume that corresponds to the volume of the consumed contents to consequently oxidize the remaining contents. While, in some instances, the contents are made to contain antioxidant, it is not desirable for the contents to contain antioxidant from the viewpoint of the health of the consumer etc.

In order to prevent the remaining contents from being oxidized, double walled containers comprising a rigid outer container (rigid outer layer container part) and a flexible inner container (flexible inner layer container part) have been made available. Such double walled containers are designed and manufactured such that the rigid outer container thereof is not deformed and the self-standing capability of the double walled container is maintained when the contents are partly consumed but the capacity of the flexible inner container is reduced by the volume that corresponds to the consumed amount of the contents so as not to allow external air to enter the flexible inner container. Such double walled containers are being employed as containers of seasonings, cosmetics and so on.

In some instances, liquid is contained in deformable containers. Such containers shrink and get deformed from their original shapes as the contents are consumed. However, containers that have shrunk and got deformed become disagreeable to give rise to a problem that such containers desirably are not be placed on the tables in restaurants. Additionally, when containers are employed for foods, they normally bear instructions to be observed, the instructions normally including the best-before date of the contents, allergy-related notices, the performance of the container etc., on the outer surfaces thereof. Then, as the container shrinks and gets deformed, those descriptions become difficult to read and even unreadable. Furthermore, as the remaining contents decrease, the remaining contents may be held to a middle part or a corner of the container to make it difficult for the container to stand upright on a plane by itself or may require the user to move the contents toward the mouth of the container in order to smoothly pour them out from the container.

In order to prevent the remaining contents from being oxidized and get rid of adverse effects such as shrinkage and deformation of the container, arrangements for forming a container by using a rigid outer container (rigid outer layer container part) and a flexible inner container (flexible inner layer container part) have been proposed. According to such proposed arrangements, when the contents are consumed, the rigid outer container is not deformed but the capacity of the flexible inner container is reduced by the volume that corresponds to the consumed amount of the contents so as not to allow external air to enter the flexible inner container. Such containers have been put to use to contain liquid seasonings such as soy source.

As double walled containers that comprise a rigid outer container that would not be deformed and a flexible inner container adapted to reduce its capacity by the volume that corresponds to the consumed amount of the contents and can be produced by conventional techniques, there have been proposed discharge containers comprising a container main body including a flexible inner container for containing contents, the flexible inner container being adapted to shrink and get deformed as the contents are reduced, and an outer container containing the inner container, the outer container being adapted to be elastically deformed and provided with an air intake for taking in external air between itself and the inner container, a discharge cap having a discharge port for discharging the contents, the discharge port being formed at the top surface of the discharge cap, and fitted to the mouth section of the container main body, an external air introducing hole for holding the outside of the double walled container and the air intake in communication with each other and an air valve for switching from a state of holding the external air introducing hole and the air intake in communication with each other to a state of shutting off the communication between them and vice versa, a gas containing space being formed in the inner container to contain gas that is more liable to be compressed than the contents, the gas containing capacity of the gas containing space being not less than 4% of the capacity of the inner container, the gas being adapted to quickly move in the inner container when the discharge container is tilted to discharge the contents from the discharge port (see, for example, Patent Literature 1)

The problem yet to be solved for double walled containers comprising a flexible inner container whose capacity is to be reduced by the volume that corresponds to the consumed amount of its contents and that is adapted to shrink and get deformed without allowing external air to enter it and a rigid outer container that is not to be deformed is that the flexible inner container needs to be held in contact with the inner surface of the outer container during the manufacturing process and the flexible inner container needs to separate from the inner surface of the outer container as the contents are consumed so as to correspond to the consumed amount of the contents and external air needs to be taken in between the flexible inner container and the outer container. As conventional techniques characterized by that an opening for taking in external air can relatively easily be formed, there have been proposed blow molded synthetic resin-made containers having an outer layer that forms an outer shell and an inner layer that forms an inner bag and separably laid on the outer layer, wherein a flat knob piece is formed at the part of the outer layer that is laid on the inner layer and located at and near the front end section of a bulged part of the inner layer, which bulged part is formed at the peripheral wall of the cylindrical mouth section of the double walled container, so as to stand up from a front end peripheral edge part, which front end peripheral edge part operates as the base end section of the flat knob piece, the base end section having a notched profile so that it can be ripped off, the bulged part of the inner layer being produced as part of the peripheral wall of the cylindrical mouth section is made to become bulged with the outer layer at the time of blow molding the container, and the knob piece is formed by pressing the part of the outer layer laid on the inner layer and located near the front end of the inner layer between the mating faces of the split mold halves that are employed for the blow molding, while the notched profile of the base end section is formed along the profile of the mold cavity at the time of forming the bulged part and the outer layer is separated from near the front end section of the inner layer and removed by the knob piece to open an air intake for introducing external air between the outer layer and the inner layer (see, for example, Patent Literature 2).

On the other hand, the bottom section of a double walled container is formed by blow molding after pinching a parison, which is made of a material for forming a rigid outer container and a material for forming a flexible inner container, by vertically middle sections of split mold halves. Therefore, the material for forming a rigid outer container and the material for forming a flexible inner container that are separable from each other are integrally united at the parting line of the bottom section of the double walled container. Thus, the material for forming the rigid outer container and the material for forming the flexible inner container will eventually separate from each other along the parting line of the bottom section of the double walled container to produce a gap that allows external air to enter between the rigid outer container and the flexible inner container unless some special measures are taken. Then, as a result, as the contents of the double walled container is reduced and the capacity of the flexible inner container is reduced accordingly, the bottom section of the flexible inner container that rigidly adheres to the spout at the top end of the container is lifted up from the bottom section of the rigid outer container.

As the bottom section of the flexible inner container is lifted up from the bottom section of the rigid outer container, the flexible inner container becomes to bear wrinkles and deformed from its proper substantially cylindrical or substantially prismatic profile. Then, as a result, if the suction tube of a pump spout extends to near the bottom section, the contents will be left unconsumed at the bottom section. The remaining contents are undesirable not only from the point of view of economy but also from the point of view of appearance particularly when the double walled container is for containing a cosmetic product. On the other hand, since how the flexible inner container is deformed varies from container to container, the amount of the contents left in the container is not uniform. In other words, in order for the container to contain a predetermined consumable amount of contents, the container needs to be filled with an excessive amount of contents. This means that the contents will undesirably and inevitably be wasted.

To date, arrangements for pressing the bottom section of the flexible inner container against the bottom section of the rigid outer container by a pump dispenser have been proposed in an attempt to solve the problem that the bottom section of the flexible inner container is lifted up from the bottom section of the rigid outer container as the contents are reduced (see, for example, Patent Literature 3).

As other arrangements for solving the problem that the bottom section of the flexible inner container is lifted up from the bottom section of the rigid outer container, there have been proposed arrangements for forming a ridge on the parting line at the underside of the bottom section of a blow molded container by pinching a vertically middle part of the parison in a horizontal direction and, at the same time, pushing down the ridge on the parting line together by means of the projected part and the recessed parts to be engaged with the projected parts formed respectively at the parison-pinching sections of the split mold halves so as to make the extended portion of the flexible inner container and the extended portion of the rigid outer container interlock with each other (see, for example, FIG. 5 of Patent Literature 4).

As arrangements for solving the problem that the bottom section of the flexible inner container is lifted up from the bottom section of the rigid outer container that are still different from the above-described ones, there have been proposed arrangements for forming a sealing ridge in a substantially center region of the bottom seal section of the container by pinching a vertically middle part of the parison in a horizontal direction and forming an adhesion layer between the layer of the material of the flexible inner container and the layer of the material of the rigid outer container at the part corresponding to the sealing ridge (see, for example, Patent Literature 5). The sealing ridge not only makes the material of the flexible inner container and the material of the rigid outer container to firmly adhere to each other to thereby solve the problem that the bottom section of the flexible inner container is lifted up from the bottom section of the rigid outer container but also suppresses the problem that the strength of the bottom section of the double walled container is reduced as the bottom section of the flexible inner container becomes separated from the bottom section of the rigid outer container.

Furthermore, there have been proposed arrangements for coating and sealing the parting line of the bottom section of the flexible inner container and that of the bottom section of the rigid outer container by means of a coating film layer and arrangements for covering the parting line from outside (underside) by means of a resin layer (see, for example, Patent Literatures 6 and 7).

With all the above-cited prior art, an opening or a gap is formed in an upper part of the double walled container to take in external air between the flexible inner container and the rigid outer container that are separated from each other. On the other hand, a special arrangement is made to rigidly unite the bottom section of the flexible inner container and the bottom section of the rigid outer container to prevent any opening or gap that can take in external air from being formed there. Then, as a result, the bottom section of the flexible inner container does not separate and rise from the bottom section of the rigid outer container if the contents are reduced.

CITATION LIST

Patent Literatures

Patent Literature 1: Japanese Patent No. 5,295,460
Patent Literature 2: Japanese Patent No. 4,936,249
Patent Literature 3: Japanese Patent No. 3,667,826
Patent Literature 4: Japanese Patent No. 4,314,423
Patent Literature 5: Japanese Patent No. 3,874,170
Patent Literature 6: Japanese Patent No. 3,710,615
Patent Literature 7: Japanese Patent No. 3,762,105

DISCLOSURE OF THE INVENTION

Problem to be Solved by the Invention

A discharge container proposed in PTL 1 can prevent external air from entering the flexible container and thereby prevent the contents from being oxidized by external air because it operates in a predetermined manner, namely it reduces the capacity of flexible inner container by the volume that corresponds to the consumed amount of the contents without deforming the outer container, when the contents are liquid that shows a low viscosity just like pure water, for example, liquid seasoning such as soy sauce or vinegar. However, it is not provided with any measures for solving the problem that the bottom section of the flexible inner container separates from the bottom section of the outer container when the contents are consumed to a large extent.

A blow molded and synthetic resin-made container disclosed in PTL 2 is not provided with any measures either for solving the problem that the bottom section of the inner container separates and rises from the bottom section of the outer container as the contents are consumed to a large extent and the volume of the contents and hence the internal capacity of the inner container are reduced.

A delamination container disclosed in PTL 3 is designed to press the bottom section of the container by means of a pump dispenser. In other words, the delamination container is indispensably required to be provided with a pump dispenser. As a matter of course, the scope of applicability of the invention disclosed in PTL 3 is limited.

A split mold to be used for blow molding a container disclosed in Patent Literature 4 has projected parts for interlocking that project from the respective surfaces of the split mold halves that are to abut each other. A split mold having projected parts for interlocking that project from the surfaces of the split mold halves that are to abut each other entails high manufacturing cost and, additionally, the projected parts for interlocking make the storage management of the mold a difficult one and prevent servicing and repairing operations from being executed efficiently.

The adhesion layer of a blow molded container disclosed in PTL 5 requires the use of a multilayer extrusion molding die having an adhesive flow path, which has a complex configuration, and hence also requires the use of a complex operation control circuit. Therefore, such an arrangement inevitably entails high manufacturing cost if compared with arrangements for manufacturing blow molded containers having no adhesion layer.

Coating and sealing the parting line at the bottom section of the flexible inner container and also the parting line at the bottom section of the rigid outer container of a double walled container by means of a coating film layer as disclosed in PTL 6 and covering the parting line by means of a resin layer as disclosed in PTL 7 entail an additional processing operation that needs to be executed after the molding process. Then, the production efficiency inevitably falls and the manufacturing cost rises to make these arrangements undesirable ones.

OBJECT OF THE INVENTION

This invention was made in view of the above-identified problems of double walled containers comprising a relatively rigid outer container and a flexible inner container that can change its capacity in the outer container to correspond to the amount of the contents contained in it. The object of the present invention is to provide a double walled container that can be manufactured easily with molding materials and a molding device that do not differ substantially from conventional ones and of which the bottom section of the inner container does not separate and rise up from the bottom section of the outer container even when the contents are consumed and depleted and the internal capacity of the flexible inner container is reduced and also a method of manufacturing the same.

Means for Solving the Problems

In the first aspect of the present invention, there is provided a double walled container formed by blow molding from a parison having an outer layer for forming a rigid outer layer container part of the container and an inner layer for forming a flexible inner layer container part of the container, characterized in that the double walled container comprises a container bottom section formed by blow molding after sandwiching a vertically middle part of the parison between split mold halves in a horizontal direction, at least a part of the container bottom section being the portion sandwiched by the split mold halves and that the container bottom section has at the underside of the container bottom section a bottom projection formed from the outer layer of the rigid outer layer container part and the outer layer of the flexible inner layer container part and, at the bottom projection, an extended portion of the rigid outer layer container part and an extended portion of the flexible inner layer container part respectively have protrusions and recesses of different heights as viewed in the horizontal direction such that the protrusions and the recesses interlock with each other so as for the extended portions not to be vertically shifted from each other.

In the second aspect of the present invention, there is provided a self-standing double walled container formed by using a double walled container in the first aspect of the invention so as to additionally comprise a skirt member installed around the bottom projection thereof.

In the third aspect of the present invention, there is provided a method of manufacturing a double walled container by molding by means of a split mold a rigid outer layer container part and a flexible inner layer container part so as to be held in contact with each other and partially separable from each other, characterized in that the double walled container comprises a container bottom section formed by blow molding after sandwiching a vertically middle part of the parison between split mold halves in a horizontal direction, at least a part of the container bottom section being the portion sandwiched by the split mold halves and that the container bottom section formed by an extended portion of the rigid outer layer container part and an extended portion of the flexible inner layer container part has a bottom projection formed at the lower and outer side relative to the container bottom section and the extended portion of the rigid outer layer container part and the extended portion of the flexible inner layer container part respectively have at the bottom projection protrusions and recesses of different heights as viewed in the horizontal direction such that the protrusions and the recesses interlock with each other so as for the extended portions not to be vertically shifted from each other.

Preferably, in a double walled container provided in the first aspect of the present invention, the protrusions and the recesses are arranged such that the extended portion of the rigid outer layer container part surrounds the extended portion of the flexible inner layer container part at the bottom projection and a constricted part is formed between the container bottom section and the bottom projection.

Preferably, in a double walled container provided in the first aspect of the present invention, the protrusions and the recesses include a recessed part formed at the bottom projection by the projected parts for forming the protrusions and recesses that are formed at both of the split mold halves and abut each other when the split mold halves are put together.

Preferably, with the method of manufacturing a double walled container provided in the third aspect of the present invention, the protrusions and the recesses are molded such that the extended portion of the rigid outer layer container part surrounds the extended portion of the flexible inner layer container part at the bottom projection and a constricted part is formed between the container bottom section and the bottom projection.

Preferably, with the method of manufacturing a double walled container provided in the third aspect of the present invention, the protrusions and the recesses include a recessed part formed at the bottom projection by the projected parts for forming the protrusions and recesses that are formed at both of the split mold halves and abut each other when the split mold halves are put together.

Advantages of the Invention

Thus, according to the present invention, there are provided a double walled container that can be manufactured easily with molding materials and a molding device that do not differ substantially from conventional ones and of which the bottom section of the inner container thereof does not rise up and separate from the bottom section of the outer container thereof even when the contents are consumed and depleted and the internal capacity of the flexible inner container is reduced and also a method of manufacturing the same. Additionally, there is provided a self-standing double walled container as a preferable embodiment of double walled container provided in the first aspect of the present invention

BRIEF DESCRIPTION OF THE DRAWINGS

FIG. 1 is a schematic longitudinal cross-sectional view of a double walled container manufactured by an embodiment of method of manufacturing a double walled container according to the present invention.

FIG. 2 is an enlarged schematic cross-sectional view of the cylindrical lateral wall of a double walled container manufactured by the first embodiment of method of manufacturing a double walled container taken along line II-II in FIG. 1.

FIG. 5A is a schematic front view of a lower part a parison after being sandwiched between the two split mold halves and blown to expand, FIG. 5B is a schematic left side view of the lower part of the parison after being sandwiched between the two split mold halves and blown to expand and FIG. 5C is a partial cross-sectional view taken along line Vc-Vc shown in FIG. 5A.

FIG. 6A is a schematic front view of a lower part of a double walled container after the excessive burr of the parison is cut off after the molding process, FIG. 6B is a schematic left side view of the lower part of the double walled container after the excessive burr of the parison is cut off after the molded process and FIG. 6C is a partial cross-sectional view taken along line VIc-VIc shown in FIG. 6A.

FIG. 7B is a schematic cross-sectional view of a second exemplar bottom projection of an embodiment of double walled container and FIG. 7C is a schematic cross-sectional view of a third exemplar bottom projection of the embodiment of double walled container, while

BEST MODE FOR CARRYING OUT THE INVENTION

Figure 3A:
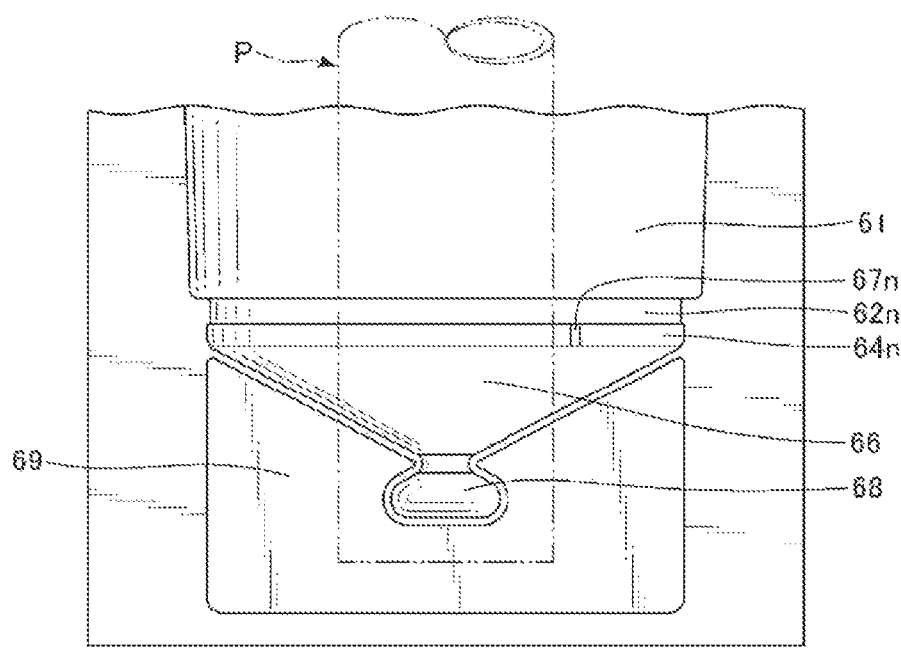
FIG. 3A is a schematic front view of the bottom section of a split mold and FIG. 3B is a schematic left side view of the bottom section of the right side split mold half of FIG. 3A.

Now, a double walled container and a method of manufacturing the same according to the present invention will be described below by referring to the drawings. As shown in FIG. 1, a double walled container 10 manufactured by an embodiment of method of manufacturing the same according to the present invention comprises a mouth section 12, a neck/shoulder section 14, a cylindrical section 18, a bottom section 20, a bottom projection 21, a cap 24 having a pump 22 and a skirt member 26.

The double walled container 10 is formed by blow molding of a molding material that is supplied in the form a parison P. As may easily be imaginable by seeing the enlarged cross-sectional view of the cylindrical section 18 shown in FIG. 2, the parison P for forming the double walled container 10 comprises a flexible inner layer 36, which includes three layers of a low density polyethylene (LDPE) layer 31, an adhesive layer 32 typically made of a polyolefin-based adhesive resin material and an ethylene-vinyl alcohol copolymer layer (EVOH) layer 33, and a rigid polypropylene (PP) outer layer 38, which are arranged in the above-mentioned order from the inside. The outer surface of the flexible inner layer 36 and the inner surface of the rigid outer layer 38 do not show any adhesiveness relative to each other and hence can easily be separated from each other.

As shown in FIG. 6A and FIG. 6B, the split mold halves D1 and D2 for parison blow molding respectively have at their lower parts mold cylindrical sections 61 for forming the cylindrical section 18 of the container to be manufactured, mold skirt member forming/installing small diameter sections 62*n* for forming the skirt member installing small diameter section 62*m*, a mold skirt member forming/installing large diameter sections 64*n* for forming the skirt member installing large diameter section 64*m* that are located below the sections 62*n*, the skirt member installing small diameter section 62*m* and the skirt member installing large diameter section 64*m* being to be used for installing the skirt member 26 to the container, mold conical bottom sections 66 for forming the bottom section 20 of the container, a mold bottom projection forming sections 68 for forming the bottom projection 21 of the container and parison excessive burr receiving recesses 69 for receiving the parison excessive burr 60 (shown in FIGS. 4A through 5C), which is the part of the parison P located below the part sandwiched between the mold conical bottom sections 66 and the mold bottom projection forming sections 68 of the split mold halves D1 and D2.

A mold ventilation recess forming protrusion 67*m* for forming a ventilation recess 67*n* is formed in the mold skirt member forming/installing large diameter section 64*n* of one of the split mold halves D1 and D2.

Figure 3B:
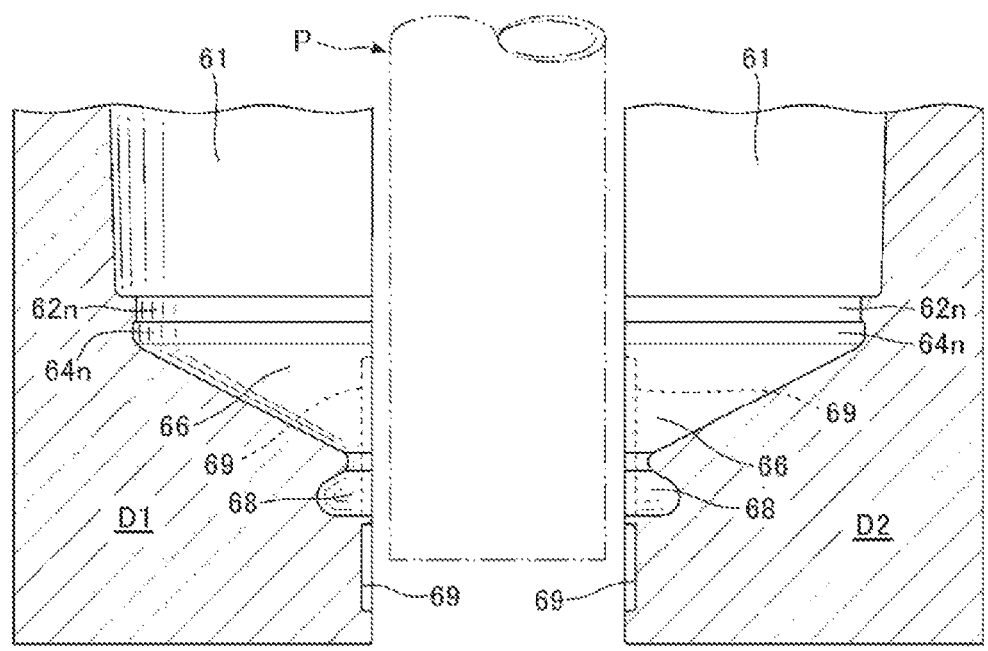
Figure 4A:
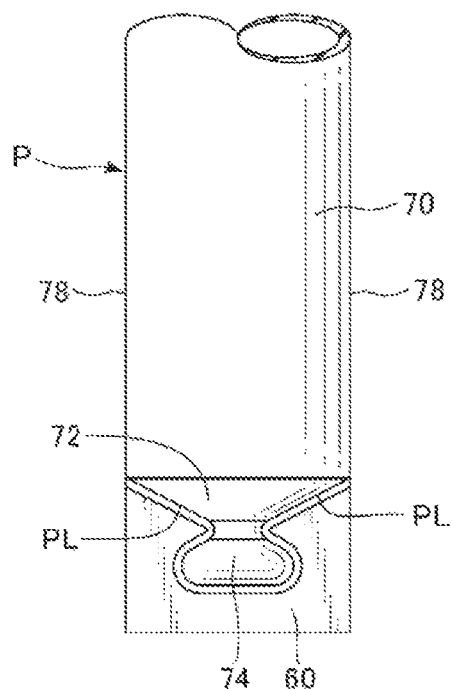
FIG. 4A is a schematic front view of a lower part of a parison after being sandwiched between the two split mold halves and FIG. 4B is a schematic left side view of the lower part of the parison after being sandwiched between the two split mold halves.
Figure 4B:
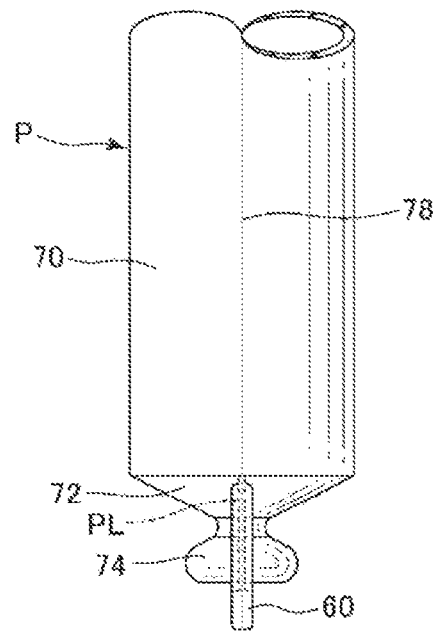

Now, the blow molding method using the split mold halves D1 and D2 will be described below. The split mold halves D1 and D2 are arranged vis-à-vis as shown in FIG. 3B. In this state, parison P is inserted between the split mold halves D1 and D2 as indicated by imaginary lines in FIG. 3A and FIG. 3B.

Subsequently, the split mold halves D1 and D2 are put together to enclose the parison P. Then, as a result, the parison P is subjected to a molding operation, after which the parison P is made to have a pre-blow cylindrical section 70 for forming the cylindrical section 18 of the container to be manufactured, a pre-blow conical bottom section 72 for forming the bottom section 20 of the container, a pre-blow bottom projection 74 for forming the bottom projection 21 of the container and a lower parison excessive burr 60. The lower parison excessive burr 60 is a substantially flat burr that extends downward from the pre-blow conical bottom section 72 along the parting line 78 byway of pinch off line PL.

Thereafter, a blow-in operation of blowing gas into the inside of the parison P is executed. Then, as a result, the cylindrical section 18, the bottom section 20 and the bottom projection 21 of the container as shown in FIG. 5A, FIG. 5B and FIG. 5C are molded from the parison. The pinch off line PL and the parison excessive burr 60 are held undeformed.

Then, the parison excessive burr (60) is scraped off along the pinch off line PL from the parison P that has been subjected to a molding operation as shown in FIG. 6A, FIG. 6B and FIG. 6C. Then, as a result, the part of the bottom section 20 located on the parting line 78 where the parison excessive burr 60 has been attached becomes pitching slit forming section PS. As shown in FIG. 6C, the flexible inner layer 36 is exposed in a center region of the bottom 20 and around the bottom projection 21 and the scraped off edge portions of the rigid outer layer 38 become to be disposed at the opposite sides of the scraped off edge portion of the flexible inner layer 36 at the pitching slit forming section PS.

Figure 7A:
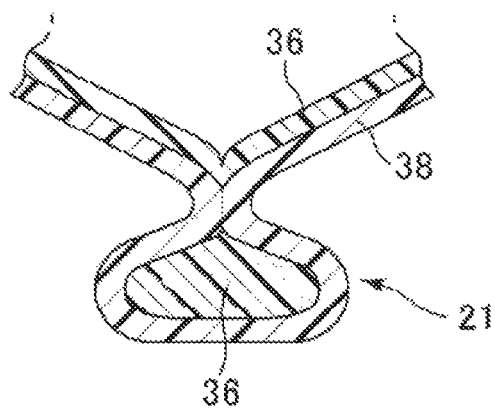
FIG. 7A is a schematic cross-sectional view of a first exemplar bottom projection of an embodiment of double walled container.

As for the internal configuration of the bottom projection 21, the outer layer embraces the inner layer without leaving any gap between them as shown in FIG. 7A.

Figure 7B:
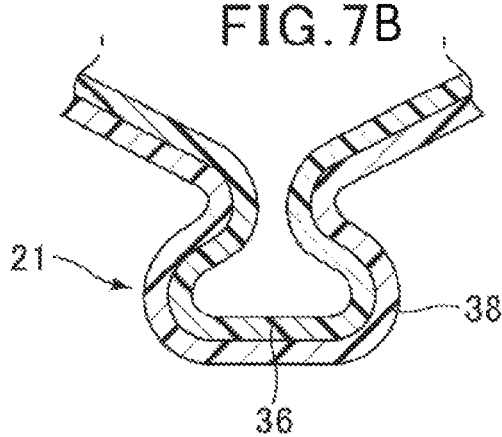

However, a space may exist in the inside of the flexible inner layer 36 in the inside of the bottom projection 21 as shown in FIG. 7B.

Figure 7C:
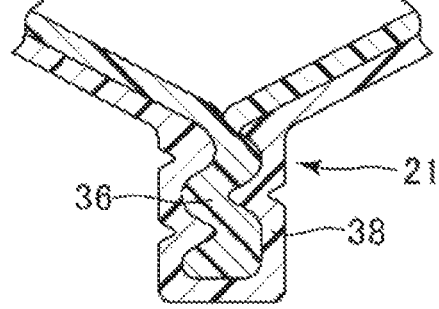

The split mold halves D1 and D2 may be provided at the abutting sides thereof with respective projections such that they are located obliquely relative to each other so as to make the laminate of the flexible inner layer 36 and the rigid outer layer 38 meander in the inside of the bottom projection 21 as shown in FIG. 7C.

Figure 7D:
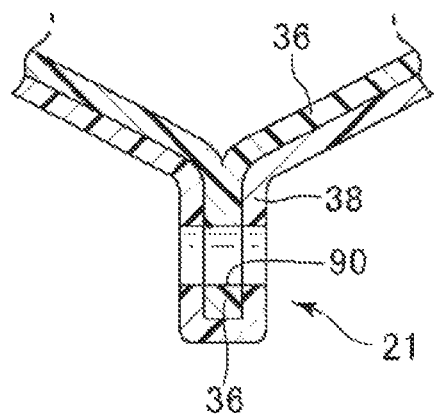
FIG. 7D is a schematic cross-sectional view of a fourth exemplar bottom projection of the embodiment of double walled container and FIG. 7E is a schematic lateral view of the fourth exemplar bottom projection of an embodiment of double walled container.
Figure 7E:
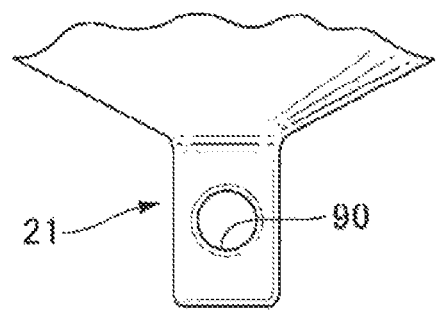

Additionally or alternatively, the split mold halves D1 and D2 may be provided at the abutting sides thereof with respective projections such that they are located exactly vis-à-vis so as to produce a hole 90 that runs through both the flexible inner layer 36 and the rigid outer layer 38 in the inside of the bottom projection 21 as shown in FIG. 7D.

Figure 8:
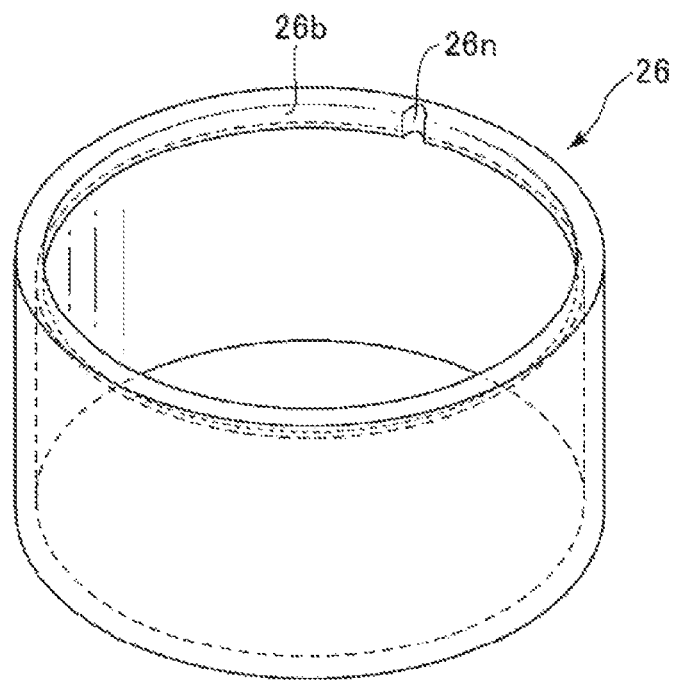
FIG. 8 is a schematic perspective view of a skirt member.

Then, the skirt member 26 as shown in FIG. 8 is installed to the molded double walled container 10 from which the parison excessive burr 60 has been scraped off.

The skirt member 26 is cylindrical and sealed at the bottom thereof. A skirt member internal peripheral projection 26*b*, which is to be engaged with the skirt member installing small diameter section 62*m*, is formed at the upper end of the inner surface of the skirt member 26. A skirt member ventilation recess 26*n* is formed at the skirt member internal peripheral projection 26*b* so as to cooperate with the ventilation recess 67*n* of the mold skirt member forming/installing large diameter section 64*n* of one of the split mold halves D1 and D2 for the purpose of ventilating the inside of the skirt member 26.

It may be needless to say that the ventilation recess 67*n* of the mold skirt member forming/installing large diameter section 64*n* and the skirt member ventilation recess 26*n* are not required when the bottom of the skirt member 26 is not sealed.

After the contents is filled in the double walled container 10 that is prepared in the above-described manner, the flexible inner layer 36 and the rigid outer layer 38 will be separated from each other to produce a gap at least at the pitching slit forming section PS, where the flexible inner layer 36 and the rigid outer layer 38 are exposed at the part of a center region of the bottom section 20 from which the parison excessive burr 60 has been scraped off. Then, as a result, when the contents are consumed and depleted and the internal capacity of the flexible inner container is reduced, external air gets into the space produced between the flexible inner container and the rigid outer container so that the reduced internal capacity of the flexible inner container is maintained in the rigid outer container. On the other hand, since the bottom section of the flexible inner container is securely held to the bottom section of the rigid outer container by the bottom projection 21, the bottom section of the flexible inner container would not separate and rise up from the bottom section of the rigid outer container.

REFERENCE SIGNS LIST

P: parison
PL: pinch off line
PS: pitching slit forming section
D1, D2: double walled container (split mold half)
12: mouth section
18: cylindrical section
20: bottom section
21: bottom projection
26: skirt member
36: flexible inner layer
38: rigid outer layer
60: parison excessive burr
61: mold cylindrical section
62*m*: skirt member installing small diameter section 62*n*: mold skirt member forming/installing small diameter section
64*m*: skirt member installing large diameter section
64*n*: mold skirt member forming/installing large diameter section
66: mold conical bottom section
67*n*: ventilation recess
68: mold bottom projection forming section

The invention claimed is:
1. A double walled container comprising:
a rigid outer layer, and
a flexible inner layer,
wherein the double walled container includes a cylindrical section and a bottom section,
wherein the bottom section comprises:
a conical bottom section forming a pitching slit where the rigid outer layer and the flexible inner layer are exposed and can be separated from each other such that external air can enter into a space between the rigid outer layer and the flexible inner layer,
a bottom projection in which an extended portion of the rigid outer layer surrounds an extended portion of the flexible inner layer, and
a constricted part formed between the conical bottom section and the bottom projection, a diameter of the extended portion of the flexible inner layer in the bottom projection being larger than a diameter of the constricted part.

2. The double walled container according to claim 1, further comprising a standing skirt member installed around the bottom projection.

3. The double walled container according to claim 1,
wherein the double walled container is self-standing, and
wherein the double walled container further comprises a skirt member installed around the bottom projection thereof.

\* \* \* \* \*